(12) United States Patent
Miyake

(10) Patent No.: US 6,208,673 B1
(45) Date of Patent: Mar. 27, 2001

(54) MULTIFUNCTION SOLID STATE LASER SYSTEM

(75) Inventor: Charles I. Miyake, Kirkland, WA (US)

(73) Assignee: Aculight Corporation, Bothell, WA (US)

(*) Notice: Subject to any disclaimer, the term of this patent is extended or adjusted under 35 U.S.C. 154(b) by 0 days.

(21) Appl. No.: 09/316,513

(22) Filed: May 21, 1999

Related U.S. Application Data

(60) Provisional application No. 60/121,196, filed on Feb. 23, 1999.

(51) Int. Cl.⁷ .................................................. H01S 3/10
(52) U.S. Cl. ................................. 372/22; 372/4; 372/5; 359/326; 359/330
(58) Field of Search ............................. 372/4, 5, 22, 19; 359/326, 330

(56) References Cited

U.S. PATENT DOCUMENTS

| | | |
|---|---|---|
| 4,791,927 | 12/1988 | Menger . |
| 5,047,668 * | 9/1991 | Bosenberg ........................ 372/21 |
| 5,144,630 * | 9/1992 | Lin ................................... 372/22 |
| 5,290,274 | 3/1994 | Levy et al. . |
| 5,655,547 | 8/1997 | Karni . |

* cited by examiner

Primary Examiner—Leon Scott, Jr.
(74) Attorney, Agent, or Firm—David G. Beck; McCutchen, Doyle, Brown & Enersen, LLP

(57) ABSTRACT

A method and apparatus for obtaining multiple wavelengths of varying temporal format from a single solid state laser are provided. Accordingly, the output from the solid state laser can either be sent through a series of non-linear crystals to obtain UV radiation or through an OPO cavity to obtain IR radiation. In order to provide the different wavelengths in the temporal formats commonly used for various medical procedures, the laser source may be operated in two different modes. When the laser system produces UV radiation a pulse of short duration is desired and the laser source is operated in the standard Q-switched mode or is mode locked. Conversely, when the laser system produces IR radiation, a pulse of long duration is desired and the laser source is operated in the free running mode. The outputs from the UV and IR portions of the system can either be directed to the object to be treated through a common beam delivery system or through separate beam delivery systems, for example utilizing optical fibers or waveguides.

21 Claims, 3 Drawing Sheets

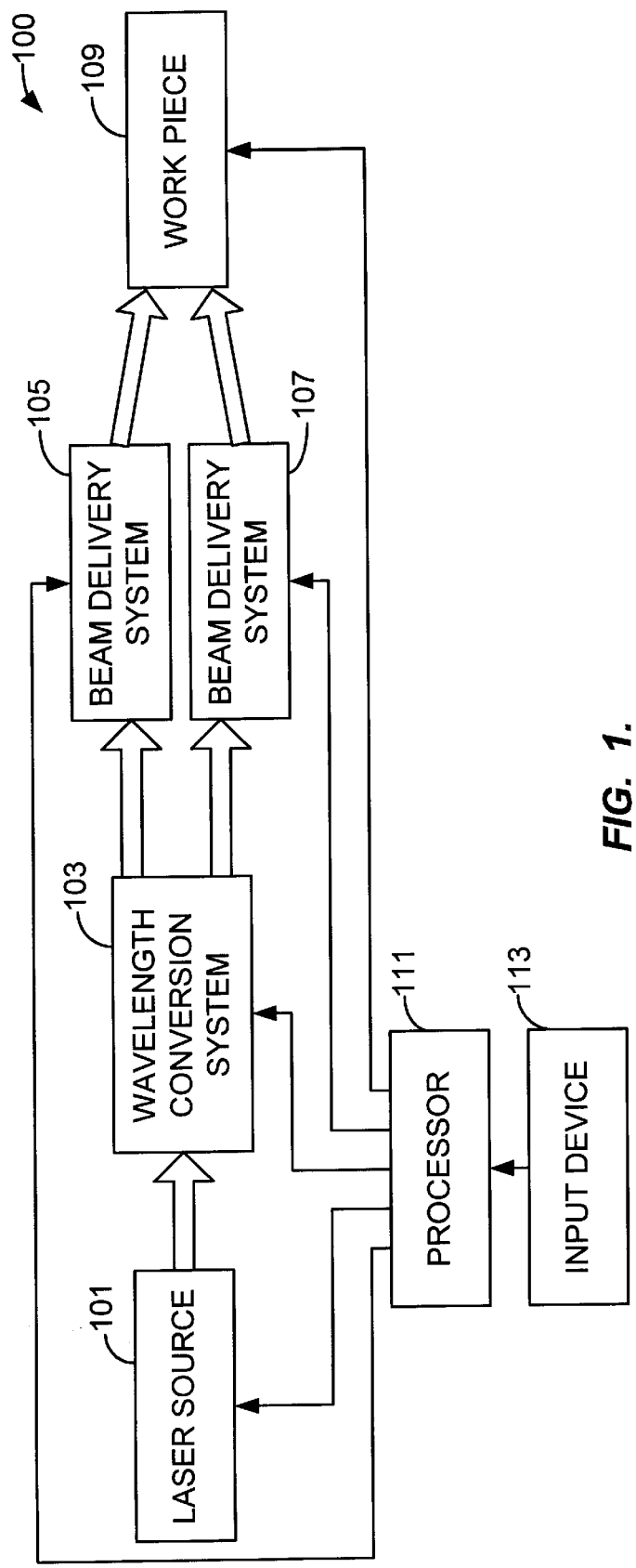
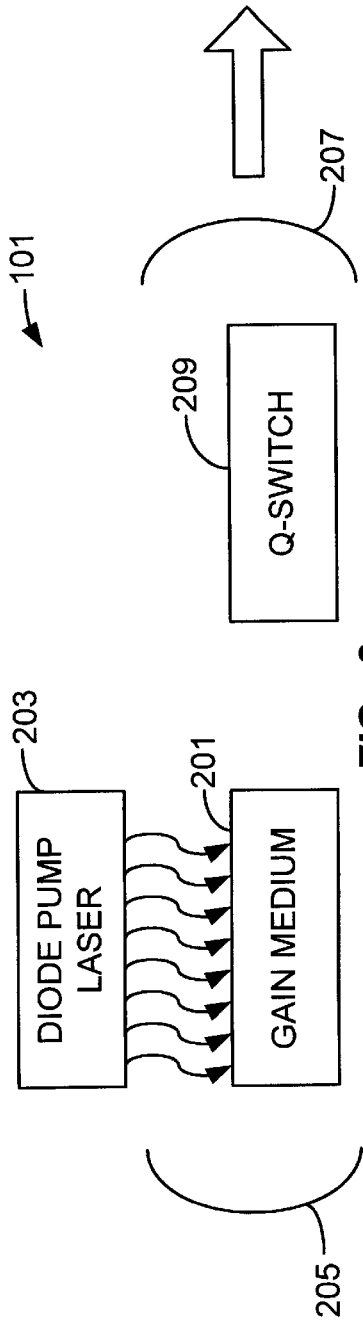
*FIG. 1.*
*FIG. 2.*

MULTIFUNCTION SOLID STATE LASER SYSTEM

CROSS-REFERENCES TO RELATED APPLICATIONS

This application claims priority of provisional patent application Ser. No. 60/121,196 filed Feb. 23, 1999, the disclosure of which is incorporated herein by reference for all purposes.

FIELD OF THE INVENTION

The present invention relates generally to laser systems and, more particularly, to a system capable of supplying multiple wavelengths in a variety of temporal formats using a single laser source.

BACKGROUND OF THE INVENTION

Lasers are presently used in a variety of applications ranging from medical procedures to micro-machining and photolithography. Lasers have gained popularity for these applications for a number of reasons. First, by varying the wavelength of the laser the absorption characteristics of the laser beam can be tailored to a specific purpose. Second, by altering the focal length and the focus of the beam, the depth and type of treatment can be varied. For example, the same laser beam can be used to either heat treat or cut a material, the differences due to the focus of the beam. Third, by controlling the intensity and pulse duration of the laser output, different levels of treatment can be easily achieved.

Recently the use of lasers has become commonplace in a variety of medical procedures including both ophthalmic and cosmetic treatments. For example, the field of corneal reshaping has been revolutionized through the use of ultraviolet (i.e., UV) lasers (e.g., photo-refractive keratectomy). In these operations a pulse of relatively short duration is desired, typically on the order of between 1 and 50 nanoseconds. In contrast to ophthalmic treatments, medical procedures requiring high tissue absorption (e.g., surgery, cosmetic skin rejuvenation and resurfacing, etc.) typically require a relatively long pulse duration, on the order of 100 to 1000 microseconds, with a wavelength of between 1 and 5 micrometers. Due to both the wavelength and the pulse duration of interest in this type of procedure, free running erbium lasers have been particularly useful.

U.S. Pat. No. 5,290,274 discloses a system that allows radiation of two different wavelengths to be simultaneously or individually applied to a given area. The two different wavelengths are produced by two different lasers, the individual wavelengths selected on the basis of absorption by a given organic tissue. The disclosed system also includes means for simultaneously directing a cooling fluid at the tissue being treated by the radiation sources. In the preferred embodiment of the disclosed system, the selected lasers are a Nd:YAG laser and an Er:YAG laser.

U.S. Pat. No. 5,655,547 discloses a technique of using multiple lasers in a surgical procedure. In this technique, the portion of tissue to be treated is simultaneously irradiated with multiple, coaxial laser beams. As disclosed, by selecting the wavelength of one laser such that the extinction length in the skin tissue is between 0.01 and 0.001 millimeters, and selecting the wavelength of a second laser such that the extinction length in the skin tissue is between 1 and 0.1 millimeters, the skin undergoes simultaneous ablation, coagulation, and shrinkage.

U.S. Pat. No. 4,791,927 discloses a technique of simultaneously irradiating a biological target with infrared radiation and ultraviolet radiation from a pair of lasers. The ultraviolet radiation cuts the target tissue while the infrared radiation cauterizes it. The use of alexandrite and xenon fluoride lasers is disclosed, as is the use of harmonic generators and Raman cells.

U.S. Pat. No. 5,144,630 discloses a multi-wavelength laser system utilizing a pulsed Nd:YAG or Nd:YLF laser. Various wavelengths are achieved through the use non-linear crystals. To achieve ultraviolet radiation, the output of the solid state laser is passed through a series of three non-linear crystals in order to obtain the fifth harmonic of the solid state laser. Infrared radiation is obtained from the solid state laser through the use of an optical parametric oscillation cavity. As the solid state laser is either Q-switched or mode locked, the pulse length of either the ultraviolet radiation or the infrared radiation ranges from subpicosecond to a few nanoseconds.

Although a variety of techniques have been developed for multi-wavelength laser systems, what is needed in the art is a laser system utilizing a single solid state laser and producing short pulses of ultraviolet radiation or long pulses of infrared radiation. The present invention provides such a system.

SUMMARY OF THE INVENTION

The present invention provides a method and apparatus for obtaining multiple wavelengths of varying temporal format from a single solid state laser. According to the invention, the output from the solid state laser can either be sent through a series of non-linear crystals or through an optical parametric oscillation (i.e., OPO) cavity. Ultraviolet (i.e., UV) radiation is obtained from the non-linear crystals and infrared (i.e., IR) radiation is obtained from the OPO cavity. Short pulse temporal formats are achieved by operating the laser in the standard Q-switched mode or by mode locking the laser. Long pulse temporal formats are achieved by operating the solid state laser in a free running mode. The outputs from the UV and IR portions of the system can either be directed to the object (e.g., tissue) to be treated through a common beam delivery system or through separate beam delivery systems. Suitable beam delivery systems are preferably fabricated from optical fibers or waveguides.

In at least one embodiment of the invention, the laser source for the multi-wavelength system is comprised of a gain medium, such as Nd:YAG or Nd:YLF, that is contained within an optical cavity. The gain medium is pumped by either a diode laser or a diode array. Preferably an intracavity Q-switch is used to obtain the desired short pulse temporal format. Additionally, in the preferred embodiment of the invention the Q-switch can be disabled during the pump pulse, thereby allowing the laser source to operate in the free-running mode in order to achieve the long pulse temporal format.

UV radiation is obtained from the system by passing the output from the laser source through a series of non-linear crystals. In the preferred embodiment of the invention, three non-linear crystals are used in order to obtain the fifth harmonic of the laser source. Assuming a Nd:YLF source, the fifth harmonic has a wavelength of approximately 210.6 nanometers. The pulse width of the output from the non-linear crystals is between about 1 and 50 nanoseconds and in the preferred embodiment between about 7 and 15 nanoseconds. Although other wavelengths can be obtained from the non-linear crystals by using the output from either the first or the second non-linear crystal (i.e., the second or fourth harmonic), preferably the fifth harmonic from the third non-linear crystal is used.

IR radiation is obtained from the system by passing the output from the laser source through an OPO cavity. The preferred gain medium in the OPO cavity is periodically polled lithium niobate although other periodically polled crystals such as RTA, KTP, or barium titanate can also be used. Assuming that periodically polled lithium niobate is used, the output wavelength of the OPO is 2.9 micrometers. When the laser source is used to produce IR radiation, it is operated in a free running mode. As a consequence, the pulse width of the output from the OPO cavity is between about 100 and 1000 microseconds, and preferably between about 400 and 600 microseconds.

A further understanding of the nature and advantages of the present invention may be realized by reference to the remaining portions of the specification and the drawings.

BRIEF DESCRIPTION OF THE DRAWINGS

FIG. 1 is a block diagram illustrating the overall system according to the invention;

FIG. 2 is a block diagram of the preferred embodiment of the laser source;

DESCRIPTION OF THE SPECIFIC EMBODIMENTS

Figure 3:
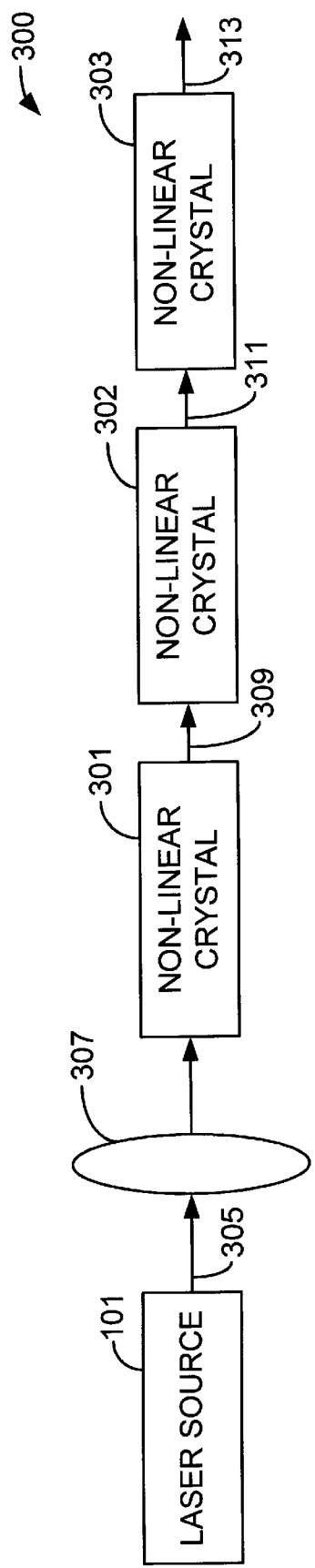
FIG. 3 is an illustration of a UV wavelength conversion system.

FIG. 1 is a block diagram illustrating a laser system 100 according to the invention. Depending upon the characteristics of the output beam, system 100 can be used in a variety of applications including medical (e.g., ophthalmic, neurosurgery, cosmetic surgery, etc.), materials processing (e.g., cutting, drilling, welding), and lithography. In order to achieve the desired low cost and compact design, system 100 uses a single laser source 101. The output of source 101 passes through one or more optical stages in a wavelength conversion system 103, thus allowing single laser source 101 to be used in a variety of applications. The output from wavelength conversion system 103 can use a single beam delivery system 105 regardless of the selected wavelength. Alternately, one or more additional beam delivery systems 107 can be used.

The selection of the beam delivery system can be driven by wavelength (e.g., fiber or waveguide systems that are optimized for particular wavelength regimes) or by application (e.g., one wavelength utilizing an ophthalmic light delivery system and a second wavelength using a hand-held surgical light knife). Regardless of the beam delivery system, the output of the system is eventually directed at an object 109 to be treated.

If desired, one or more aspects of system 100 can be placed under the control of a processor 111. Preferably processor 111 is programmable via a user input device 113. Processor 111 can be used to control laser source 101, wavelength conversion system 103, and the selection of a beam delivery system (assuming multiple beam delivery systems). Processor 111 can also be used to control the actual beam delivery system, for example through the movement of an optical scanning head. Processor 111 can also be used to control the motion of work piece 109, assuming that work piece 109 is coupled to one or more controllable translation stages. If desired, a variety of system monitoring devices can be used and coupled to processor 111, thus providing system feedback. For example, the wavelength, beam intensity, and pulse duration can be monitored and controlled by the system controller.

FIG. 2 is a block diagram of the preferred embodiment of laser source 101. A laser gain medium 201 is optically pumped, for example with a solid state laser 203. Solid state laser 203 can either be a single laser or a diode array and can emit one or a plurality of radiation beams. As shown, gain medium 201 is placed within an optical cavity formed by mirrors 205 and 207. Assuming that the proper lasing conditions are met, e.g., sufficient pump radiation intensity from laser 203, proper mirror alignment, etc., lasing will occur. Mirror 207 is designed to be partially transmitting, therefore allowing light generated by the lasing process to exit the optical cavity.

In at least one embodiment of laser source 101, a Q-switch 209 is included. Although Q-switch 209 is preferably an intra-cavity Q-switch as shown, a Q-switch placed in the optical path but outside of the optical cavity formed by mirrors 205 and 207 can also be used.

Laser source 101 has two modes of operation. In a first mode, diode laser 203 is operated in a quasi-continuous wave (i.e., quasi-CW) mode, generating a pulse of light of approximately 1 storage lifetime of gain medium 201. Gain medium 201 is preferably either a Nd:YAG or Nd:YLF material although other materials that can be optically pumped and that emit radiation at a wavelength of approximately 1 micrometer can also be used. For the preferred embodiment, Nd:YLF is used for medium 201 and the pulse width for diode pump 203 is between about 100 and 1000 microseconds, and preferably between about 400 and 600 microseconds. After Q-switching, the output width of the pulse is typically between about 1 and 50 nanoseconds, and preferably between about 7 and 15 nanoseconds, with a wavelength of 1.053 micrometers (assuming Nd:YLF). In the second mode of operation, diode laser 203 is again operated in the quasi-CW mode with a pulse width of between about 100 and 1000 microseconds, and preferably between about 400 and 600 microseconds. In the second mode of operation, Q-switch 209 is disabled during the pulse of pump laser 203, thus enabling the laser oscillator to operate in a free running mode. Although Q-switch 209 can be physically removed from the cavity, this approach is more time consuming and labor intensive than simply using an electro-optic Q-switch and applying a constant voltage to the Q-switch in order to disable it. It should be understood that some Q-switches operate in reverse and therefore require that no voltage be applied to the Q-switch to disable it. In the second mode of operation the output pulse from laser source 101 has a pulse length approximately matching that of pump laser 203. Therefore in this mode of operation the output from laser source 101 has a pulse length of between about 100 and 1000 microseconds and a wavelength of approximately 1 micrometer.

FIG. 3 is an illustration of a UV conversion system 300 which is used as one of the wavelength converters 103. The output from laser source 101, operating in the first mode of operation, is passed through a series of non-linear optical elements 301–303. Since source 101 is operated in the first mode, the pulse width of incident source beam 305 is between about 1 and 50 nanoseconds, and typically between about 7 and 15 nanoseconds. In the preferred embodiment of conversion system 300, one or more lenses 307 are placed in beam 305 in order to focus the light prior to it passing through the non-linear elements.

Non-linear element 301 produces a second harmonic of incident light beam 305. Assuming that laser 101 uses Nd:YLF, the wavelength of the frequency doubled output beam 309 is approximately 526.5 nanometers. Although output beam 309 can be directed into beam delivery system 105, preferably it is further wavelength shifted.

In the preferred embodiment of the invention, output beam 309 passes through second non-linear element 302. The wavelength of output beam 311 is again frequency doubled, yielding a fourth harmonic wavelength of 263.3 nanometers. As with output beam 309, output beam 311 can be directed into beam delivery system 105 although it is preferably wavelength shifted a third time by non-linear element 303. Beam 305 and fourth harmonic beam 311 are frequency mixed in element 303, creating a fifth harmonic wavelength of approximately 210.6 nanometers for beam 313. Note that if a different material is used for gain medium 201, the wavelengths of incident beam 305 and the outputs from the non-linear crystals can be shifted. For example, if a Nd:YAG medium is used, the wavelengths of beams 305, 309, 311, and 313 become 1064, 532, 266, and 212.8 nanometers, respectively.

A variety of crystal materials can be used for non-linear optical elements 301–303. In the preferred embodiment, non-linear element 301, producing the second harmonic of the incident beam, is fabricated from KTP, LBO, or KTA. Preferably non-linear element 302, producing the fourth harmonic, is fabricated from BBO, CLBO, or KDP. Preferably non-linear element 303, producing the fifth harmonic, is fabricated from BBO or CLBO.

Figure 4:
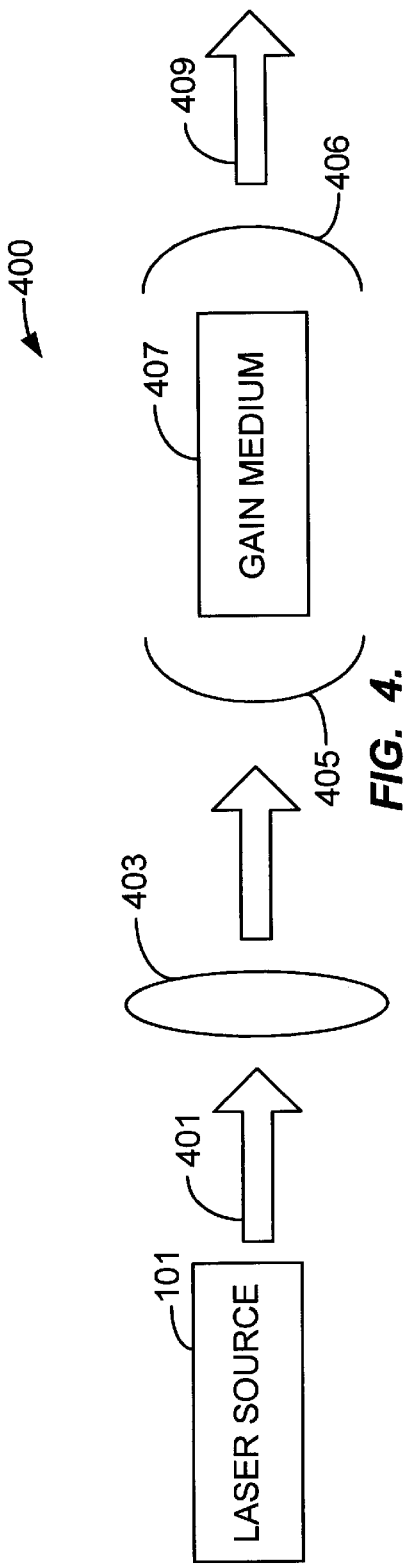
FIG. 4 is an illustration of a mid-IR wavelength conversion system.

FIG. 4 is an illustration of an IR wavelength conversion system 400 that is used in conjunction with UV wavelength conversion system 300 to provide a wide range of wavelengths. IR conversion system 400 uses an input beam 401 from laser source 101 in which source 101 is operated in the second mode. As noted above, in this mode the oscillator is operating in a free running mode, thus outputting a beam with a wavelength of approximately 1 micrometer and a pulse width of between about 100 and 1000 microseconds, and preferably between about 400 and 600 microseconds. Beam 401 passes through beam shaping optics 403 prior to entering an OPO cavity comprised of a pair of mirrors 405–406 and a gain medium 407.

Gain medium 407 is a periodically polled non-linear material. In the preferred embodiment medium 407 is a periodically polled lithium niobate crystal although other periodically polled materials can also be used. For example, periodically polled RTA, KTP, or barium titanate can be used for medium 407. The advantage of using a periodically polled non-linear material is that it provides high non-linear gain but, due to the material's quasi-phase matching properties, does not suffer from double refraction (i.e., walk-off) losses. Thus the OPO with medium 407 is able to efficiently convert an approximately 1 micrometer, 100 to 1000 microsecond pulse from free running laser source 101 to a mid-IR pulse of the same duration. Assuming a periodically polled lithium niobate crystal, an output beam 409 from the OPO has a wavelength of approximately 2.9 micrometers and a relatively long pulse width.

Figure 5:
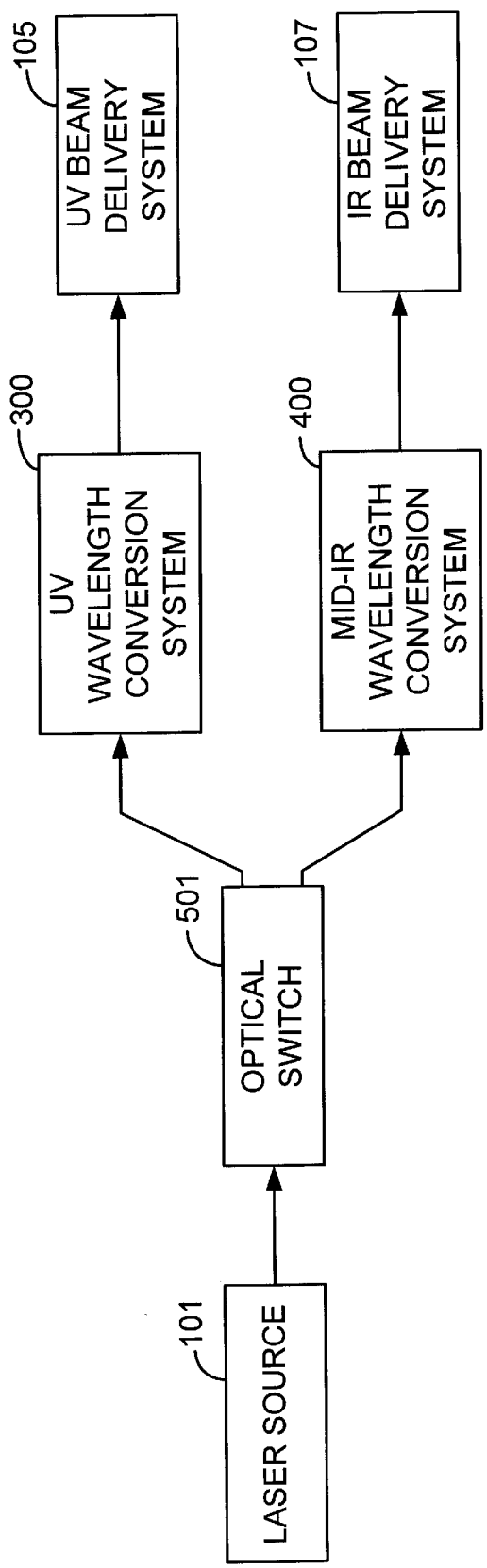
FIG. 5 is an illustration of the preferred embodiment of the invention.

FIG. 5 is an illustration of the preferred embodiment of system 100. As shown, an optical switch 501 determines whether the output from source 101 passes through UV wavelength conversion system 300 or mid-IR conversion system 400. Although the illustrated system uses a different beam delivery system for the output from systems 300 and 400, a single beam delivery system can be used, assuming that it is capable of directing both UV and mid-IR wavelength pulses.

Figure 6:
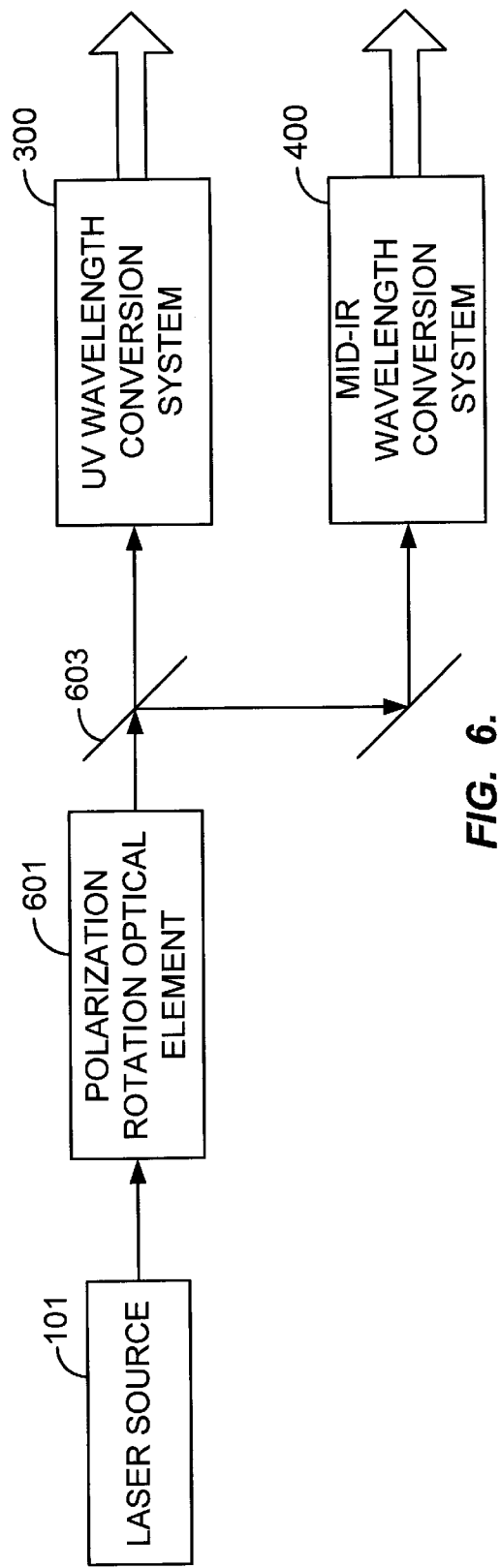
FIG. 6 is an illustration of the preferred optical switch for use with the invention.

A variety of different types of optical switches 501 can be used with the present invention. For example, optical switch 501 can be as simple as a flip mirror. In this instance, when the mirror is not in place the source beam passes to one wavelength conversion system and when the mirror is placed within the beam path the source beam is directed to a second wavelength conversion system. In the preferred embodiment shown in FIG. 6, the optical switch is comprised of a polarization rotating element 601 and a polarization sensitive beam splitter 603. In this embodiment element 601 can be an electro-optical element (e.g., Pockels cell) or a half-wave plate mounted to a rotating mechanical stage. Depending upon the polarization of source beam 605 after it passes through element 601, either the beam is passed by beam splitter 603 to UV wavelength conversion system 300 or reflected by beam splitter 603 to mid-IR wavelength conversion system 400.

The output from wavelength conversion systems 300 and 400 can be used for a variety of applications. Depending upon the intended application as well as the wavelength of the beam, the beam delivery system can use optical fibers, optical waveguides, or mirrors. Furthermore the delivery system can direct the beam to a hand-held delivery system (e.g., for cutting or treating tissue), to a multi-axis automated system (e.g., for machining or photolithographic applications), or to an ophthalmic apparatus designed for use in ophthalmic surgery (e.g., photorefractive keretectomy).

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An optical device, comprising:
   a laser source producing radiation of a first wavelength, wherein said laser source operates in a first short temporal mode, said first short temporal mode having a first pulse duration of between about 1 and 50 nanoseconds, and wherein said laser source operates in a second long temporal mode, said second long temporal mode having a second pulse duration between about 100 and 1000 microseconds;
   an optical switch, wherein an input to said optical switch is said radiation from said laser source, said optical switch directing said radiation from said laser source between at least a first optical path and a second optical path, wherein said laser source operates in said first short temporal mode when said radiation is directed to said first optical path, and wherein said laser source operates in said second long temporal mode when said radiation is directed to said second optical path;
   at least one non-linear crystal in said first optical path, said at least one non-linear crystal producing UV radiation; and
   an optical parametric oscillator cavity including a periodically polled non-linear crystal in said second optical path, said optical parametric oscillator cavity producing IR radiation.

2. The optical device of claim 1, said laser source further comprising a gain medium and a diode pump laser.

3. The optical device of claim 2, wherein said gain medium is selected from the group consisting of Nd:YAG and Nd:YLF.

4. The optical device of claim 2, said laser source further comprising an intra-cavity Q-switch, wherein said intracavity Q-switch reduces a diode pump laser pulse duration of between about 100 and 1000 microseconds to said first short temporal mode having said first pulse duration of between about 1 and 50 nanoseconds.

5. The optical device of claim 2, said laser source further comprising an intra-cavity Q-switch, wherein said intra-cavity Q-switch reduces a diode pump laser pulse duration of between about 100 and 1000 microseconds to said first short temporal mode, wherein said first short temporal mode has a third pulse duration of between about 7 and 15 nanoseconds.

6. The optical device of claim 1, wherein said first wavelength is approximately 1 micrometer.

7. The optical device of claim 1, wherein said at least one non-linear crystal is comprised of:
 a first non-linear crystal, wherein said first non-linear crystal outputs a second harmonic of said first wavelength;
 a second non-linear crystal, wherein an input to said second non-linear crystal is said second harmonic, wherein said second non-linear crystal outputs a fourth harmonic of said first wavelength; and
 a third non-linear crystal, wherein an input to said third non-linear crystal is said fourth harmonic, wherein said third non-linear crystal outputs a fifth harmonic of said first wavelength.

8. The optical device of claim 7, wherein said first non-linear crystal is selected from the group consisting of KTP, LBO, and KTA.

9. The optical device of claim 7, wherein said second non-linear crystal is selected from the group consisting of BBO, CLBO, and KDP.

10. The optical device of claim 7, wherein said third non-linear crystal is selected from the group consisting of BBO and CLBO.

11. The optical device of claim 1, wherein said periodically polled non-linear crystal is selected from the group consisting of periodically polled lithium niobate, periodically polled RTA, periodically polled KTP, and periodically polled barium titanate.

12. The optical device of claim 1, further comprising at least one beam delivery system, wherein said beam delivery system directs either said UV radiation or said IR radiation.

13. The optical device of claim 1, further comprising:
 a first beam delivery system coupled to said at least one non-linear crystal, said first beam delivery system directing said UV radiation; and
 a second beam delivery system coupled to said optical parametric oscillator cavity, said second beam delivery system directing said IR radiation.

14. The optical device of claim 1, further comprising a processor coupled to said laser source for controlling said laser source.

15. The optical device of claim 14, wherein said processor is coupled to said optical switch and controls whether said optical switch directs said radiation from said laser source to said first optical path or to said second optical path.

16. The optical device of claim 1, said optical switch further comprising a polarization rotating element.

17. The optical device of claim 16, said optical switch further comprising a polarization sensitive beam splitter.

18. A method of producing multiple wavelengths from a single laser source, said method comprising the steps of:
 selecting between a first optical path and a second optical path;
 when said first optical path is selected, said method further comprising the steps of:
  directing an output of a first wavelength from said single laser source along said first optical path;
  pulsing said laser source with a pulse duration of between about 1 and 50 nanoseconds;
  converting said first wavelength output to a second wavelength output, wherein said second wavelength is an ultraviolet wavelength; and
  directing said second wavelength output with a first beam delivery system; and
 when said second optical path is selected, said method further comprising the steps of:
  directing said output of said first wavelength from said single laser source along said second optical path;
  pulsing said laser source with a pulse duration of between about 100 and 1000 microseconds;
  converting said first wavelength output to a third wavelength output, wherein said third wavelength is an infrared wavelength; and
  directing said third wavelength output with a second beam delivery system.

19. The method of claim 18, wherein said first and second beam delivery systems are the same beam delivery system.

20. The method of claim 18, wherein said step of converting said first wavelength output to a second wavelength output further comprises the steps of:
 passing said first wavelength output from said single laser source through a first non-linear crystal, wherein said first non-linear crystal produces a first non-linear crystal output, wherein said first non-linear crystal output is a second harmonic of said first wavelength;
 passing said first non-linear crystal output through a second non-linear crystal, wherein said second non-linear crystal produces a second non-linear crystal output, wherein said second non-linear crystal output is a fourth harmonic of said first wavelength; and
 passing said second non-linear crystal output through a third non-linear crystal, wherein said third non-linear crystal produces a third non-linear crystal output, wherein said third non-linear crystal output is a fifth harmonic of said first wavelength.

21. The method of claim 18, wherein said step of converting said first wavelength output to a third wavelength output further comprises the step of passing said first wavelength output from said single laser source through an optical parametric oscillator cavity, said optical parametric oscillator cavity comprising a periodically polled non-linear crystal.

* * * * *